United States Patent

[11] 3,590,950

| [72] | Inventor | Phillip M. Wilson |
| | | 5415 Hartly Road, Satsuma, Ala. 36572 |
| [21] | Appl. No. | 33,687 |
| [22] | Filed | May 1, 1970 |
| [45] | Patented | July 6, 1971 |

[54] PORTABLE STEP FOR VEHICLE MAINTENANCE AND REPAIR
10 Claims, 11 Drawing Figs.

[52] U.S. Cl. ................................................. 182/150, 182/206
[51] Int. Cl. ................................................. E06c 5/24
[50] Field of Search ....................................... 182/150, 92, 152, 156

[56] References Cited
UNITED STATES PATENTS

| 2,575,503 | 11/1951 | Warren | 182/150 |
| 2,848,150 | 8/1958 | Tans | 182/150 |
| 2,851,312 | 11/1958 | Hoff | 182/150 |
| 2,964,767 | 12/1958 | Egbert | 182/150 |
| 2,973,052 | 2/1961 | Miller | 182/150 |
| 3,078,952 | 2/1963 | Kelling | 182/150 |

*Primary Examiner*—Reinaldo P. Machado
*Attorney*—Polachek & Saulsbury

ABSTRACT: A portable step includes a platform hingedly secured to a frame which mounts on a tire of a vehicle to provide a standing surface for a mechanic servicing the vehicle. The frame includes a horizontal rod having feet which contact diagonally opposite portions of the tire sidewall. A vertical hook support is pivotally connected at its base to the center of the rod and the free end thereof engages the rear surface of the tire adjacent the uppermost portion thereof. To provide an adjustable platform stop, a sleeve is slidably mounted on the hook support and a bracket extends between the sides of the platform and the sleeve. In an alternate embodiment, the hook length is adjustable by engaging a prominence projecting from the base of the hook into one of a plurality of vertically spaced notches.

PATENTED JUL 6 1971
3,590,950
SHEET 1 OF 2
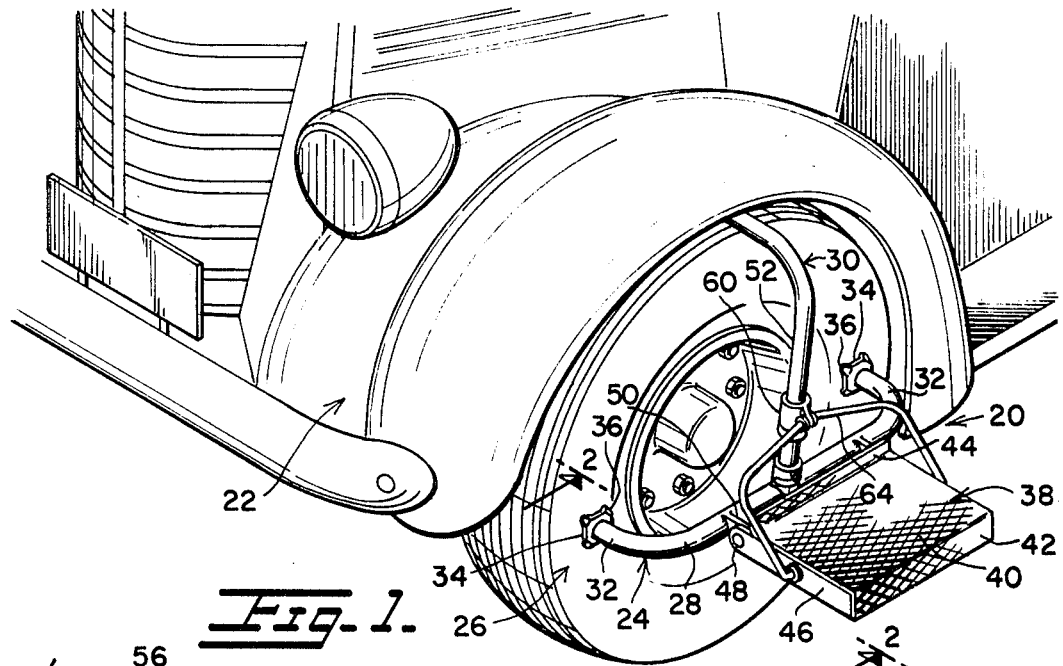
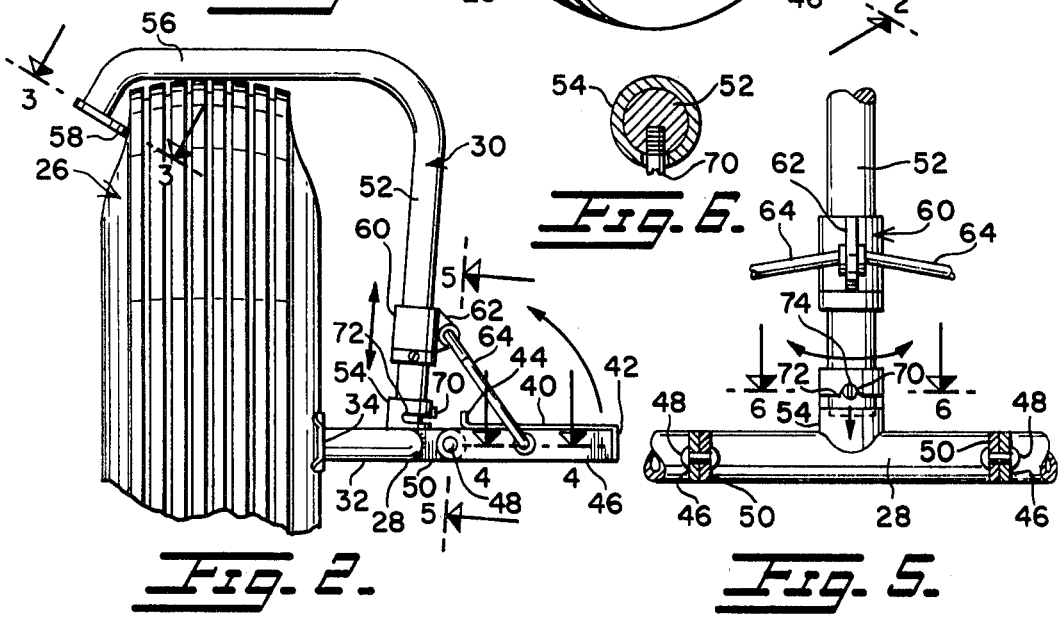
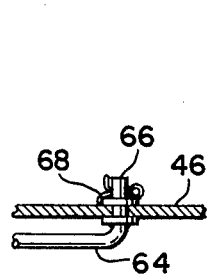
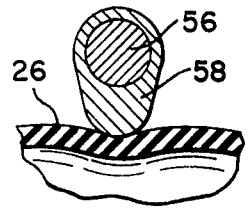
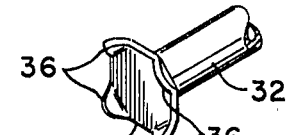
INVENTOR.
PHILLIP M. WILSON
BY Polachek & Saulsbury
ATTORNEYS

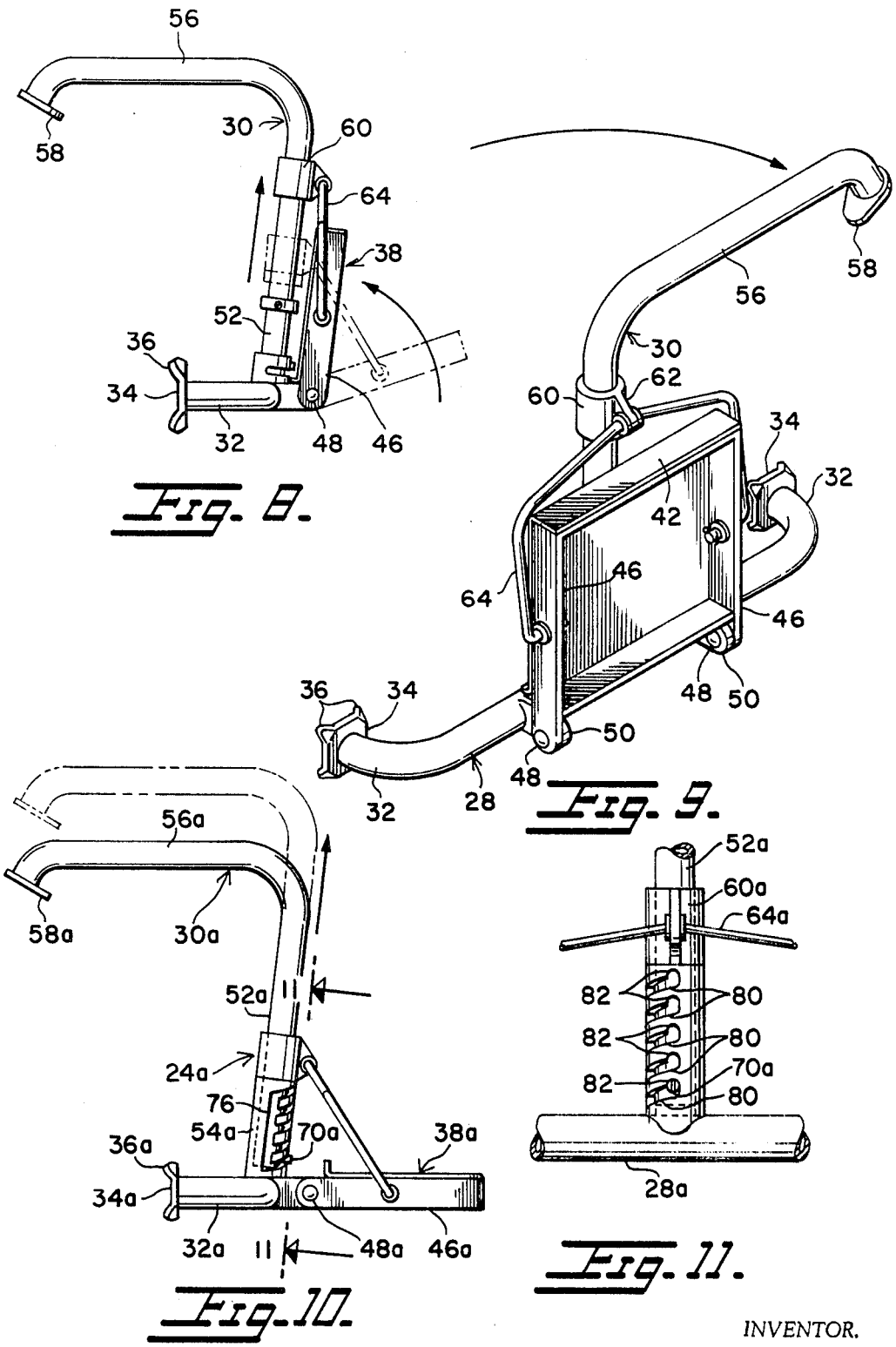

PORTABLE STEP FOR VEHICLE MAINTENANCE AND REPAIR

Portable supports for automotive repair mechanics.

A mechanic often finds great difficulty when attempting to reach into various portions of the engine compartment to service the engine and any accessories. Most frequently the mechanic will utilize any available means in his immediate vicinity for supporting himself so that he may reach further into the engine compartment. Thus, many accidents have been caused by mechanics who were standing on greasy or oily crates or drums when repairing vehicles. An additional source of danger was the wheel hub which projects from the center of most truck wheels and upon which mechanics often rest one foot in attempting to gain access to an otherwise unaccessible portion of the compartment. Also many accidents have been caused when mechanics would stand on frame members or support themselves by a vehicle fender.

In an attempt to rectify this situation, several step devices have been developed. Many of these devices were floor-supported devices, e.g. a stepping stool. Other, more sophisticated devices, included a step which was supported by the front tire of the vehicle being serviced. Disadvantages have been encountered with the use of these tire-supported steps. Among the disadvantages was the fact that many of these steps were not portable. They were not easily storable and could not be folded for such storage. Another disadvantage with these steps was the fact that they were not adjustable to accommodate vehicles having different tire sizes. Some of these devices were, in fact, unsafe as they did not provide sufficient tire-gripping means to maintain the step under the weight of the mechanic.

It is an object of the present invention to provide a portable step of the general character described which is so constructed that it is subject to any of the foregoing disadvantages.

It is a further object of the present invention to provide a portable step which is sturdy, easily mounted on tire of a vehicle, lightweight, yet can be manufactured by mass production methods at a cost appreciably lower than prior devices designed to serve the same function.

A still further object of the present invention is to provide a portable step of the general character described which includes a platform pivotally mounted to a frame and with the platform and frame being foldable to a compact configuration wherein storage is greatly facilitated.

A further object of the present invention is to provide a portable step of the general character described which provides a three-point support for the weight of a mechanic and which is readily adjustable to be mounted on tires of varying sizes.

Other objects of the invention in part will be obvious and in part will be pointed out hereinafter.

The invention accordingly consists in the features of construction, combinations of elements arrangements of parts as set forth in the portable step hereinafter described and of which the scope of invention will be indicated in the appended claims.

In the accompanying drawings in which are shown some of the various possible embodiments of the invention:

FIG. 1 is a fragmentary perspective view of a vehicle with a portable step constructed in accordance with and embodying the present invention mounted on a front tire of the vehicle and with a platform of the step pivoted to its operative position.

FIG. 2 is a fragmentary auxiliary view taken substantially along the line 2-2 of FIG. 1 and showing, in greater detail, a frame which engages portions of the tire on the rear and front sidewalls thereof and with the platform pivotally mounted to the front of the frame.

FIG. 3 is an enlarged fragmentary sectional view taken substantially along the line 3-3 of FIG. 2 and showing a flange secured to the free end of a hook portion of the frame with the flange engaging the rear sidewall of the vehicle tire.

FIG. 4 is an enlarged fragmentary sectional view taken substantially along the line 4-4 of FIG. 2 and showing a portion of a bracket which is journaled for rotation in the platform to support the platform in its operative position.

FIG. 5 is a fragmentary enlarged sectional view taken substantially along the line 5-5 of FIG. 2 and showing further details of the frame including a horizontal rod and portions of the hook member; further illustrated is a swivelable connection between the platform and a flange projecting from the rod, along with a collar slidably mounted to the hook member adjacent the base thereof and with the bracket being engaged in the collar.

FIG. 6 is an enlarged sectional view taken along the line 6-6 of FIG. 5 and showing prominence projecting radially from the base of the hook and extending into a notch formed in a boss extending upwardly from the center of the rod; the notch is positioned within a slot and the prominence is moveable within the slot so that the hook may be rotated within the boss.

FIG. 7 is a fragmentary perspective view of an enlarged foot which projects laterally from each end of the horizontal rod and engages the front sidewall of the vehicle tire.

FIG. 8 is an elevational view of the device showing the platform in its folded position; additionally shown in double dot-and-dash lines is the position of the platform intermediate its operative position (extending substantially horizontally) and its inoperative, folded position.

FIG. 9 is perspective view of the device in its fully folded inoperative storage position wherein both the platform and the hook are rotated to lie in substantially vertical parallel planes.

FIG. 10 is an elevational view of an alternate embodiment of the invention wherein a prominence at the base of a hook member is engageable within any one of a number of vertically spaced notches formed in a boss projecting upwardly from the center of generally horizontal rod which forms a portion of a frame supporting a platform.

FIG. 11 is an auxiliary view taken substantially along the line 11-11 of FIG. 10 and showing, in greater detail, the notches formed in the boss which are in fact interconnected by a vertical channel.

Referring now in detail to the drawings, the reference numeral 20 denotes a portable step constructed in accordance with and embodying the invention. The step 20 is designed for use by an automotive mechanic as a device upon which he may stand to gain access to otherwise inaccessible portions of the engine compartment of a vehicle 22. The portable step 20 includes a frame 24 which engages a front tire 26 of the vehicle being serviced.

The frame 24 is shaped generally as an inverted "T" and includes a horizontal rod portion 28 and a vertically projecting hook portion 30, which extends from the approximate center of the rod 28. The frame 24 is designed to be releasably mounted on the tire 26 and for this purpose, the rod includes opposite end portions 32 which lie generally within the horizontal plane of the rod but extend substantially perpendicular to the longitudinal axis of the rod and face the sidewall of the tire 26. The tips of the end portions 32 each include a terminal weblike foot 34. The feet 34 lie in a plane perpendicular to the longitudinal axis of the end portion 32 and is of generally square shape with outwardly turned corners 36 (see FIG. 7). The corners 36 are adapted to engage the outside sidewall of the tire 26.

A platform 38 is rotatably mounted to the horizontal rod 28. The platform 38 is utilized as a step support for the mechanic and includes an upper, generally flat surface 40 having a plurality of crosshatched ridges and grooves to prevent slipping. The upper surface 40 includes a downwardly turned front lip 42, an upwardly turned rear lip 44 serving as a kick plate and parallel sidewalls 46 which extend in vertical planes and parallel sidewalls 46 which extend in vertical planes and beyond the rear lip 44. The platform 38 is journaled for rotation on pins 48 (see FIG. 5) which lie within registered openings in rear portions of the sidewalls 46 and through flanges 50 which project from the horizontal rod 28, symmetrically spaced from the center thereof. The opposite ends of the pins 48 are suitably peened for captive retention.

As was previously mentioned, the frame 24 includes not only the horizontal rod 28 but a vertical hook 30. The hook 30 is constructed with a generally cylindrical vertical section 52, the base of which is seated in a bore formed in a boss 54 projecting upwardly from the center of the horizontal rod 28. The vertical section 52 and hence the entire hook 30 is journaled for rotation within the boss 54.

At the upper end of the vertical section 52, the hook bends to a substantially horizontal portion 56. It should be noted that the horizontal portions 56 and 28 lie in planes perpendicular to one another. The horizontal portion 56 terminates in a down turned tip with a flange 58 secured to the end thereof. The downturned tip of the horizontal portion 56 extends downwardly to the inner sidewall of the tire 26 and the flange 58 is in abutting contact with portions of the inner sidewall of the tire 26 adjacent the tread.

Returning now to the vertical section 52 of the hook 30, a sleeve 60 is slidably mounted thereon and extending through a flange 62 which projects from the sleeve is a bracket 64.

The bracket 64 is substantially U-shaped and the bight thereof extends through the opening in the flange 62. The bracket 64 includes spaced parallel legs which terminate at inturned tip portions 66 which extend into openings in the sidewalls 46 of the platform 38 (see FIG. 4). The tip portions 66 of the bracket 64 are journaled for rotation within the openings in the sidewall 46 and washers are spaced on each face of the sidewalls 46 in registry with the openings. Furthermore, a cotter pin 68 is secured through an opening in the tip portion 66 within the interior of the platform 38 for captive retention of the tip portions.

It will now be noted that when a mechanic steps on the horizontal upper surface of a platform 38 his weight will act to cause a clockwise (as viewed in FIGS. 1 and 2) moment about an axis extending through the pins 48. This moment is resisted by the bracket 64, the legs of which are under tensile stresses to prevent rotation of the platform. The platform may, however, be rotated in a counterclockwise direction as illustrated in FIG. 8. It will be observed that when a counterclockwise force or moment is created about an axis extending through the pins 48, the bracket 64 will be under compressive stresses and the sleeve 60 will slide upwardly along the vertical section 52. In FIG. 8 an intermediate position of the platform, bracket and sleeve is shown in double dot-and-dash lines.

With the portable step 20 in operative position, having its hook portion extending over the top of the tire 26 and with the terminal flange 58 in abutting contact with the inner sidewall of the tire along with the weblike feet 34 in abutting contact with the outer sidewall of the tire at diagonally opposite portions thereof, the weight of the mechanic standing on the platform will be borne by the tire 26.

In fact, an analysis reveals that the weight of the mechanic on the platform 38 will be divided into compressive forces at the web feet 34, urging the tire sidewall inwardly and additionally a compressive force at the inner sidewall transmitted through the hook 30 to the flange 58. Thus the weight of the mechanic is borne by the tire 26 which of course will not have a tendency to twist in a clockwise (as viewed in FIGS. 1 and 2) direction due to the forces applied by the portable step 20. This is because the tire additionally bears a portion of the weight of the vehicle and furthermore the tire is prevented from so moving by its axle.

Attention is now directed to the features of construction which render the portable step 20 truly portable and foldable to a compact position wherein a minimal storage space is required. As was previously noted the vertical section 52 of the hook 30 is journaled for rotation within a passageway in a central boss 54. In fact, rotation is restricted and a prominence 70 is positioned in the vertical section 52 adjacent the base thereof. The prominence 70 in the embodiment shown is a setscrew. However, any integral or nonintegral flange or other projection extending radially from the base of the vertical section 52 will serve the same function. The prominence 70 is of a size which is accommodatingly received in a horizontal slot 72 which extends through the boss 54. The slot 72 extends substantially through an arc of approximately 180°.

Thus, the ends of the slot 72 serve as stops which are contacted by the prominence 70 to limit rotation of the hook 30. In its operative position, wherein the horizontal portion 56 of the hook 30 lies in a plane perpendicular to the plane of the horizontal rod 28, the prominence 70 lies within a notch 74 formed in the upper surface of the slot 72. The prominence will be seated within the notch 74 and urged in such position by tensile forces applied to the vertical portion 52 of the hook 30 by the weight of the mechanic standing on the platform 38.

It can thus be seen that the device 20 may be folded or unfolded from operative or inoperative position. If the device is originally in its operative position it may be folded for storage by urging the platform 38 upwardly causing the sleeve 60 to slide upwardly along the vertical portion 52 of the hook and then rotating the hook in either a clockwise or counterclockwise direction so that it will not project a substantial distance beyond the plane wherein the web feet 34 lie. Of course, this procedure may be reversed, i.e. the hook may be rotated initially and subsequently the platform may be rotated.

In an alternate embodiment of the invention which is illustrated in FIGS. 10 and 11 means are provided for adjustably varying the effective length of a vertical portion 52a of a hook 30a which is a portion of a frame 24a supporting a platform 38a. In this embodiment, the hook 30a is substantially identical to the hook 30 in the embodiment previously disclosed. This embodiment is distinguished however from the previous embodiment solely in the construction of the boss 54 which permits varying the effective length of the hook so that tires of varying sizes may be accommodated by the frame 24a.

The boss illustrated in this embodiment includes a single substantially vertical slot 76 and a plurality of spaced substantially horizontally extending slots 80. Each slot 80 is positioned at a different elevation than adjacent slots 80 and extends through an arc of approximately 90° to terminate at the approximate center of the horizontal rod 28a of the frame.

At this terminal end of each slot 80 an upwardly cut notch 82 is formed. One of the notches 82 is engaged by a prominence 70a projecting radially from the vertical portion of the hook 30a. The engagement between the prominence 70a and the notch 82 is assured by the fact that the vertical portion 52a of the hook 30a will be under tensile stress when a mechanic is resting on the platform 38a.

Furthermore, seating of the prominence 70a in a notch 82 is assured by virtue of the fact that the slots 80 are upwardly canted. Hence, if a prominence is inadvertently positioned somewhere along a slot 80 intermediate its ends and a mechanic steps on the platform 38a, the component of his weight which is supported by the hook 38 will cause a tensile force which will urge the prominence upwardly along the sloped slot 80 to be seated in a notch 70a.

If the effective length of the vertical portion 52a of a hook 30a is to be increased, the user need only rotate the hook member clockwise (as viewed in FIGS. 10 and 11) so that the prominence is positioned within the vertical slot 76. Then, by pulling upwardly on the hook member, the vertical portion 52a may be lifted so that the prominence 70a is in alignment with a slot 80 at the higher elevation. Subsequently, by rotating the hook 30a in a counterclockwise direction to its original position, the hook will be locked in its new position and its effective length increased.

Thus it will be observed that there is provided a portable step which meets the objects of the invention and which is well suited for practical use.

What I claim is:

1. A portable step adapted to be mounted on a tire of an automotive vehicle, said step comprising a platform, a frame, means hingedly securing the platform to the frame, the frame including a generally horizontal member adapted to be placed diagonally across the tire, a hook member, the hook member including a generally vertical portion and a horizontal portion extending over the top of the tire, the horizontal portion of the hook member having a downwardly turned tip, means at the downwardly turned tip engaging the inner side wheel of the tire, a sleeve member, the sleeve member being mounted on the vertical portion of the hook member and sliding therealong, a bracket, the bracket having parallel spaced legs and a bight, the bight joining corresponding ends of the legs, the opposite ends of the legs being journaled for rotation in the platform, the bight of the bracket being journaled for rotation in the sleeve, the bracket being under tensile stress and preventing rotation of the platform about under the frame when a user stands on the platform, the platform being rotatable to a substantially vertical position and the sleeve sliding upwardly along the substantially vertical position and the sleeve sliding upwardly along the substantially vertical portion of the hook member when the platform is moved to its vertical position.

2. A device constructed in accordance with claim 1, wherein the substantially vertical portion of the hook member to the horizontal member, whereby the horizontal portion of the hook member may be moved from its operative position to a position lying substantially within a vertical plane parallel to the vertical plane of the platform when the platform is folded.

3. A device constructed in accordance with claim 2, wherein limit means are provided for stopping the rotation of the hook member when the horizontal portion of the hook member lies in a substantially vertical plane parallel to the plane of the folded platform.

4. A device constructed in accordance with claim 3, wherein the means for rotatably securing the hook member includes a boss. the boss projecting upwardly from the horizontal member, means forming a bore within the bore the hook member being journaled for rotation within the boss, the limit means including a prominence projecting radially from the hook member and a slot formed in the boss, the prominence being slidably received within the slot and contacting the opposite ends of the slot after rotating approximately 180°.

5. A device constructed in accordance with claim 4, wherein means are provided in the slot for indexing the prominence when the hook member assumes an operative position, said indexing means including a notch formed in the upper surface of the slot, said notch being positioned at the midlength of the horizontal member.

6. A device constructed in accordance with claim 1, wherein the horizontal member includes end portions, the end portions extending in a plane substantially perpendicular to the longitudinal axis of the horizontal member and facing the sidewall of the tire, means forming webbed feet at the tips of the end portions, the webbed feet forming a broad based contact with the sidewall of the tire and exerting compressive forces on the sidewall of the tire.

7. A device constructed in accordance with claim 6, wherein the webbed feet are of substantially square plan configuration and include corners, the corners being turned to project into the sidewall of the tire and provide a gripping surface.

8. A device constructed in accordance with claim 1, wherein means are provided to adjustably vary the effective length of the vertical portion of the hook member.

9. A device constructed in accordance with claim 8, wherein a boss is formed at the approximate midlength of the horizontal member, means forming a bore in the boss is provided, the substantially vertical portion of the hook member being journaled for rotation in the bore, the means for varying the effective length of the hook including a plurality of substantially parallel slots in the boss at spaced elevations therealong, the slots being joined along a common end, the vertical portion of the hook member including a prominence, the prominence being selectively slidable into any one of the slots, whereby the effective length of the hook member may be increased by positioning the prominence in the slot at a higher elevation than a previous slot.

10. A device constructed in accordance with claim 9, wherein indexing means are provided to secure the prominence at the end of a selected slot, said indexing means including a notch in the upper surface of each slot and at the end thereof distant from the common ends.